US007877209B2

(12) United States Patent
Harris et al.

(10) Patent No.: US 7,877,209 B2
(45) Date of Patent: Jan. 25, 2011

(54) RADAR COLLISON WARNING SYSTEM FOR ROOFTOP MOUNTED CARGO

(76) Inventors: Steven M. Harris, 565 Brainard Cir., Lafayette, CO (US) 80026; Amanda Brooke Cousins, 3 Harvest La., Plainville, CT (US) 06062

( * ) Notice: Subject to any disclaimer, the term of this patent is extended or adjusted under 35 U.S.C. 154(b) by 1087 days.

(21) Appl. No.: 11/527,926

(22) Filed: Sep. 26, 2006

(65) Prior Publication Data

US 2008/0077327 A1 Mar. 27, 2008

(51) Int. Cl.
*G08G 1/16* (2006.01)
*G06K 9/00* (2006.01)
(52) U.S. Cl. ............... 701/301; 701/25; 701/36; 342/70; 340/435; 340/436; 340/457; 340/903; 340/947; 382/104; 318/445
(58) Field of Classification Search ............ 701/301; 342/70
See application file for complete search history.

(56) References Cited

U.S. PATENT DOCUMENTS

| 3,716,833 | A | * | 2/1973 | Roth .................. 340/904 |
| 4,916,429 | A | * | 4/1990 | Hicks et al. .......... 340/436 |
| 5,389,912 | A | * | 2/1995 | Arvin ................. 340/435 |
| 5,710,553 | A | * | 1/1998 | Soares ............... 340/903 |
| 6,151,539 | A | * | 11/2000 | Bergholz et al. ...... 701/25 |
| 6,670,912 | B2 | * | 12/2003 | Honda ................. 342/70 |
| 6,684,149 | B2 | * | 1/2004 | Nakamura et al. ..... 701/96 |
| 7,027,615 | B2 | * | 4/2006 | Chen ................ 382/104 |
| 2002/0074959 | A1 | * | 6/2002 | Van Wiemeersch ..... 318/445 |
| 2004/0183661 | A1 | | 9/2004 | Bowman |
| 2005/0012603 | A1 | * | 1/2005 | Ewerhart et al. ...... 340/435 |
| 2006/0119473 | A1 | * | 6/2006 | Gunderson et al. ..... 340/435 |
| 2006/0267830 | A1 | * | 11/2006 | O'Boyle ............... 342/70 |
| 2007/0103282 | A1 | * | 5/2007 | Caird et al. .......... 340/435 |
| 2007/0164854 | A1 | * | 7/2007 | Hill .................. 340/457 |

* cited by examiner

*Primary Examiner*—Thomas G Black
*Assistant Examiner*—Lin B Olsen
(74) *Attorney, Agent, or Firm*—Patton Boggs LLP

(57) ABSTRACT

Rooftop cargo racks, otherwise simply known as roof-racks, provide an option for transporting cargo that does not use space inside a vehicle. However, despite the usefulness of roof-racks, once cargo is secured to a roof-rack on a vehicle there is the added potential for a collision between the cargo and some overhead obstruction—such as, for example only, a garage door, over-hanging sign, public parking structures, and tree branch. Previous collision avoidance systems that employ either ultrasonic acoustic or Doppler-based radar systems are poorly suited for detecting the potential of a collision between rooftop mounted cargo and an overhead obstruction. By contrast, aspects of the present invention provide systems and methods for reducing the risk of a collision between rooftop mounted cargo and overhead obstructions by providing a more suitable radar-based means for detecting overhead obstructions and warning drivers and, if present, passengers in vehicles when there is a risk of a collision.

15 Claims, 8 Drawing Sheets

RADAR COLLISON WARNING SYSTEM FOR ROOFTOP MOUNTED CARGO

FIELD OF THE INVENTION

The invention relates to sensor systems and, in particular to sensor systems employed in vehicles for collision avoidance.

BACKGROUND OF THE INVENTION

Rooftop cargo racks, otherwise simply known as roof-racks, provide a structure onto which cargo can be securely fastened above a vehicle. An advantage of a roof-rack is that it provides an option for transporting cargo that does not use space inside a vehicle. This is particularly useful for large items, such as for example, but not limited to, recreational equipment (e.g. bicycles, skies, etc.), cargo-boxes and building materials.

Despite the usefulness of roof-racks, once cargo is secured to a roof-rack on a vehicle there is the added potential for a collision between the cargo and some overhead obstruction—such as, for example only, a garage door, public parking structure, over-hanging sign and tree branch. Collisions between rooftop mounted cargo and an overhead obstruction may in turn lead to damage of the cargo, the vehicle and/or to the overhead obstruction. Unfortunately, such collisions are not simple to avoid since it is often difficult for a driver to visually assess the amount of clearance there may be, if any, between the top of rooftop mounted cargo and an overhead obstruction. Moreover, the risk of a collision may increase if a driver forgets, as a result of fatigue or routine, that cargo has been mounted to the top of the vehicle.

Most presently available collision avoidance systems are designed to detect people and/or objects in the direct forward or reverse paths of a vehicle. Only a few collision avoidance systems have been designed for detecting the presence of overhead obstructions, and in turn warning a driver of a potential collision between rooftop mounted cargo and a detected overhead obstruction. The previous systems available each have a number of drawbacks that have prevented their adoption and/or rendered the systems inadequate for their intended purpose. For example, many of the presently available collision avoidance systems employ either ultrasonic acoustic systems or Doppler-based radar systems, which are both poorly suited to the task of detecting the potential for a collision between rooftop mounted cargo and an overhead obstruction.

Ultrasonic acoustic systems often suffer from poor performance resulting from low signal directivity and a severely limited ability to filter out noise and spurious signals from vehicle vibrations and environmental factors (e.g. snow, rain, wind). Moreover, the effective volume of space through which ultrasonic acoustic signals propagate to provide usable information is quasi-spherical since ultrasonic acoustic waves have an inherent radial propagation pattern that is not easily altered. The lack of a directive signal means that ultrasonic acoustic devices cannot be focused on a specifically shaped volume of space (i.e. a 3-D zone) to the exclusion of other spaces outside the desired space. In turn, the effective volume of space from which information can be gleaned is often either too large or too small to effectively provide an accurate assessment of dangers to a vehicle, cargo and/or surrounding objects. U.S. Patent Application No. 2004/0183661 to Bowman discloses an example of a sensing system exclusively employing ultrasonic acoustic waves. Depending on the power output of the ultrasonic acoustic transmitter the system provided by Bowman can be expected to produce either too many false-positives (i.e. an indication of a possible collision that is not a real risk) or too many errors (i.e. not providing a suitable indication of an actual collision risk).

Doppler-based radar systems require relative motion in the radial direction between a radar transmitter and a target. Stationary targets or targets having a slow relative speed may not be detected at all or at least not until the vehicle is moving towards the target at a sufficiently fast speed, at which time it may be too late to avoid a collision. As a result, Doppler-based radar is not a good option for collision avoidance systems that are to be employed for determining the risk of a collision between rooftop mounted cargo and an overhead obstruction because of the poor performance of Doppler-based radar at low speeds at which most collisions of this type occur, and thus, where the collision avoidance system would be useful.

SUMMARY OF THE INVENTION

According to an aspect of an embodiment of the invention there is provided a radar-based collision warning system for determining when there is a risk of a potential collision between an overhead obstruction and cargo mounted on a roof of a vehicle, the system comprising: a radar-based detector including a forward radar sensor, mountable on a front portion of a vehicle, the forward radar sensor operable to emit electromagnetic pulses and receive subsequent pulse reflections in a specifically shaped first antenna beam pattern so as to gather information about the presence or absence of objects within the space covered by the first antenna beam pattern, the first antenna beam pattern is defined as a portion of the space above a plane approximately coplanar with the roof of the vehicle; and a user interface unit connectable to the radar-based detector for receiving at least some of the information gathered by the radar-based detector, the user interface unit including an alarm unit and a computer program product including computer usable program code for determining the risk of collision between an object and cargo mounted on the roof of the vehicle, the computer usable program code including program instructions for: processing the information gathered by the radar-based detector to determine if an object is within the space covered by the first antenna beam pattern; and warning a user that a risk of a potential collision is present when an object is determined to be in the space covered by the first antenna beam pattern.

In some embodiments, the user interface further comprises an alternate display for providing another link between a user and the system. In some embodiments, the computer program product further comprises a portion of memory.

In some embodiments, the computer program product includes the operability to perform the functions of a local modem providing connectivity between the user interface unit and at least one component of the radar-based detector. In some more specific embodiments, the local modem includes at least one of a simple wire connection, an optical fibre modem, a wireless modem, a Universal Serial Bus (USB) port, an Ethernet modem, in order to establish a data link with at least one component of the radar-based detector.

In some embodiments, the user interface unit further comprises a drive/engine sensor for providing a signal indicative as to whether or not the engine of the vehicle is running, and wherein the computer usable program code also includes program instructions for: processing the signal from the drive/engine sensor to determine whether or not the vehicle is not running; and placing the collision avoidance system in a stand-by mode in order to save power when it is determined that the vehicle is not running.

In some embodiments, the user interface unit further comprises a magnetron sensor for providing a signal indicative as to whether or not the vehicle is moving, and wherein the computer usable program code also includes program instructions for: processing the signal from the magnetron sensor to determine whether or not the vehicle is moving; and placing the collision avoidance system in a stand-by mode in order to save power when it is determined that the vehicle is not moving.

In some embodiments, the forward radar sensor is further operable to emit electromagnetic pulses and receive subsequent pulse reflections in a specifically shaped second antenna beam pattern so as to gather information about the presence or absence of objects within the space covered by the second antenna beam pattern, where the second antenna beam pattern is defined as a portion of the space below a plane approximately coplanar with the roof of the vehicle and any object in said space is in a driver's forward line of sight; and wherein the computer usable program code also includes program instructions for: processing the information gathered by the radar-based detector to determine if an object is within the space covered by the second antenna beam pattern; and not warning a user that a risk of a potential collision is present when an object is determined to be in the space covered by the second antenna beam pattern, irrespective of whether or not the object is also in the space covered by the first antenna beam pattern.

In some embodiments, the radar-based detector further comprises: a cargo radar sensor operable to emit electromagnetic pulses and receive subsequent pulse reflections in a specifically shaped second antenna beam pattern so as to gather information about the presence or absence of objects within the space covered by the second antenna beam pattern, where the second antenna beam pattern is defined as a portion of the space above a plane approximately coplanar with the roof of the vehicle where cargo may be mounted; and wherein the computer usable program code also includes program instructions for: processing the information gathered by the radar-based detector to determine if cargo is mounted on the roof of the vehicle; and placing the collision avoidance system in a stand-by mode in order to save power when it is determined that cargo has not been mounted on the roof of the vehicle.

In some embodiments, the radar-based detector further comprises: a rear radar sensor operable to emit electromagnetic pulses and receive subsequent pulse reflections in a specifically shaped second antenna beam pattern so as to gather information about the presence or absence of objects within the space covered by the second antenna beam pattern, where the second antenna beam pattern is defined as a rear portion of the space above a plane approximately coplanar with the roof of the vehicle; and wherein the computer usable program code also includes program instructions for: processing the information gathered by the radar-based detector to determine if an object is within the space covered by the second antenna beam pattern; and warning a user that a risk of a potential collision is present when an object is determined to be in the space covered by the second antenna beam pattern.

In some embodiments, the rear radar sensor is further operable to emit electromagnetic pulses and receive subsequent pulse reflections in a specifically shaped third antenna beam pattern so as to gather information about the presence or absence of objects within the space covered by the third antenna beam pattern, where the third antenna beam pattern is defined as a portion of the space below a plane approximately coplanar with the roof of the vehicle and any object in said space is in a driver's rear line of sight; and wherein the computer usable program code also includes program instructions for: processing the information gathered by the radar-based detector to determine if an object is within the space covered by the third antenna beam pattern; and not warning a user that a risk of a potential collision is present when an object is determined to be in the space covered by the third antenna beam pattern, irrespective of whether or not the object is also in the space covered by the second antenna beam pattern.

According to another aspect of the invention there is provided a method for determining a risk of a potential collision between an object and cargo mounted on the roof of the vehicle, the method comprising: transmitting electromagnetic pulses using a specifically shaped first antenna beam pattern, wherein the first antenna beam pattern is defined as a portion of the space above a plane approximately coplanar with the roof of the vehicle; receiving reflections of the transmitted electromagnetic pulses from the space covered by the first antenna beam pattern; processing the reflections to determine if an object is within the space covered by the first antenna beam pattern; and warning a user that a risk of a potential collision is present when an object is determined to be in the space covered by the first antenna beam pattern.

According to another aspect of the invention, the method further comprises: transmitting electromagnetic pulses using a specifically shaped second antenna beam pattern, wherein the second antenna beam pattern is defined as a portion of the space below a plane approximately coplanar with the roof of the vehicle and any object in said space is in a driver's forward line of sight; receiving reflections of the transmitted electromagnetic pulses from the space covered by the second antenna beam pattern; processing the information gathered by the radar-based detector to determine if an object is within the space covered by the second antenna beam pattern; and not warning a user that a risk of a potential collision is present when an object is determined to be in the space covered by the second antenna beam pattern, irrespective of whether or not the object is also in the space covered by the first antenna beam pattern.

According to another aspect of the invention, the method further comprises: transmitting electromagnetic pulses using a specifically shaped second antenna beam pattern, wherein the second antenna beam pattern is defined as a portion of the space above a plane approximately coplanar with the roof of the vehicle where cargo may be mounted; receiving reflections of the transmitted electromagnetic pulses from the space covered by the second antenna beam pattern; processing the information gathered by the radar-based detector to determine if cargo is mounted on the roof of the vehicle; and placing the collision avoidance system in a stand-by mode in order to save power when it is determined that cargo has not been mounted on the roof of the vehicle.

According to another aspect of the invention, the method further comprises: transmitting electromagnetic pulses using a specifically shaped second antenna beam pattern, wherein the second antenna beam pattern is defined as a rear portion of the space above a plane approximately coplanar with the roof of the vehicle; receiving reflections of the transmitted electromagnetic pulses from the space covered by the second antenna beam pattern; processing the information gathered by the radar-based detector to determine if an object is within the space covered by the second antenna beam pattern; and warning a user that a risk of a potential collision is present when an object is determined to be in the space covered by the second antenna beam pattern.

According to another aspect of the invention, the method further comprises: transmitting electromagnetic pulses using a specifically shaped third antenna beam pattern, wherein the third antenna beam pattern is defined as a rear portion of the space below a plane approximately coplanar with the roof of the vehicle; receiving reflections of the transmitted electromagnetic pulses from the space covered by the third antenna beam pattern; processing the information gathered by the radar-based detector to determine if an object is within the space covered by the third antenna beam pattern; and not warning a user that a risk of a potential collision is present when an object is determined to be in the space covered by the third antenna beam pattern, irrespective of whether or not the object is also in the space covered by the second antenna beam pattern.

According to an aspect of an embodiment of the invention there is provided a kit of parts comprising: a computer program product including computer usable program code for determining the risk of collision between an object and cargo mounted on the roof of the vehicle, the computer usable program code including program instructions for: transmitting electromagnetic pulses using a specifically shaped first antenna beam pattern, wherein the first antenna beam pattern is defined as a portion of the space above a plane approximately coplanar with the roof of the vehicle; receiving reflections of the transmitted electromagnetic pulses from the space covered by the first antenna beam pattern; processing the information gathered by the radar-based detector to determine if an object is within the space covered by the first antenna beam pattern; and warning a user that a risk of a potential collision is present when an object is determined to be in the space covered by the first antenna beam pattern.

In some embodiments, the computer usable program code further includes program instructions for: transmitting electromagnetic pulses using a specifically shaped second antenna beam pattern, wherein the second antenna beam pattern is defined as a portion of the space below a plane approximately coplanar with the roof of the vehicle and any object in said space is in a driver's forward line of sight; receiving reflections of the transmitted electromagnetic pulses from the space covered by the second antenna beam pattern; processing the information gathered by the radar-based detector to determine if an object is within the space covered by the second antenna beam pattern; and not warning a user that a risk of a potential collision is present when an object is determined to be in the space covered by the second antenna beam pattern, irrespective of whether or not the object is also in the space covered by the first antenna beam pattern.

In some embodiments, the computer usable program code further includes program instructions for: transmitting electromagnetic pulses using a specifically shaped second antenna beam pattern, wherein the second antenna beam pattern is defined as a portion of the space above a plane approximately coplanar with the roof of the vehicle where cargo may be mounted; receiving reflections of the transmitted electromagnetic pulses from the space covered by the second antenna beam pattern; processing the information gathered by the radar-based detector to determine if cargo is mounted on the roof of the vehicle; and placing the collision avoidance system in a stand-by mode in order to save power when it is determined that cargo has not been mounted on the roof of the vehicle.

In some embodiments, the computer usable program code further includes program instructions for: transmitting electromagnetic pulses using a specifically shaped second antenna beam pattern, wherein the second antenna beam pattern is defined as a rear portion of the space above a plane approximately coplanar with the roof of the vehicle; receiving reflections of the transmitted electromagnetic pulses from the space covered by the second antenna beam pattern; processing the information gathered by the radar-based detector to determine if an object is within the space covered by the second antenna beam pattern; and warning a user that a risk of a potential collision is present when an object is determined to be in the space covered by the second antenna beam pattern.

In some embodiments, the computer usable program code further includes program instructions for: transmitting electromagnetic pulses using a specifically shaped third antenna beam pattern, wherein the third antenna beam pattern is defined as a rear portion of the space below a plane approximately coplanar with the roof of the vehicle; receiving reflections of the transmitted electromagnetic pulses from the space covered by the third antenna beam pattern; processing the information gathered by the radar-based detector to determine if an object is within the space covered by the third antenna beam pattern; and not warning a user that a risk of a potential collision is present when an object is determined to be in the space covered by the third antenna beam pattern, irrespective of whether or not the object is also in the space covered by the second antenna beam pattern.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

Figure 1A:
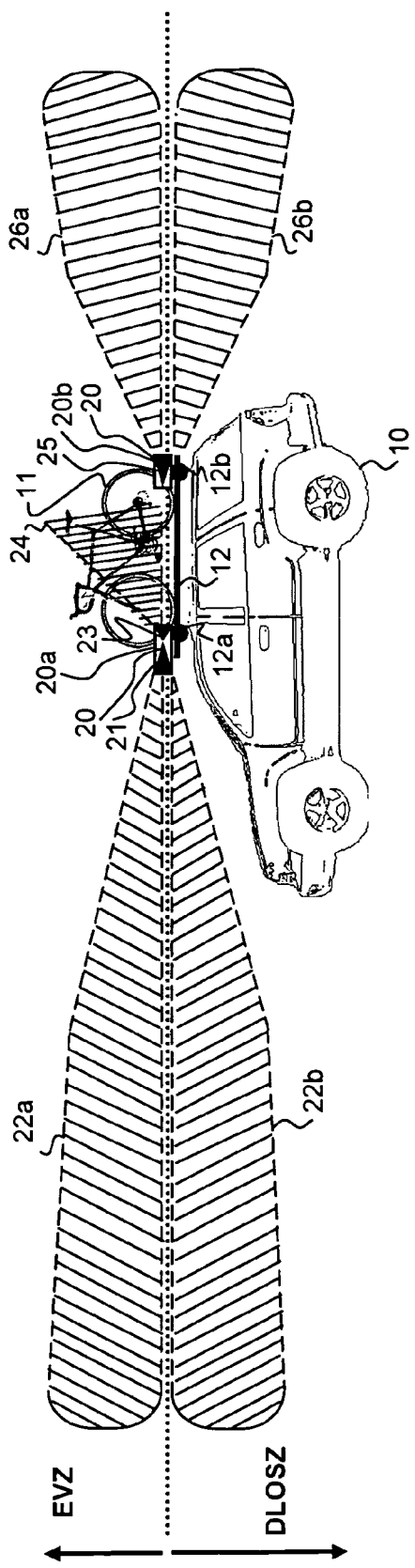
FIG. 1A is a side view schematically showing a collision avoidance system for a vehicle and a number of associated zones and antenna beam patterns around the vehicle in accordance with aspects of the invention.

Rooftop cargo racks, otherwise simply known as roof-racks, provide an option for transporting cargo that does not use space inside a vehicle. However, despite the usefulness of roof-racks, once cargo is secured to a roof-rack on a vehicle there is the added potential for a collision between the cargo and some overhead obstruction—such as, for example only, a garage door, over-hanging sign, public parking structure and tree branch, etc.

Previous collision avoidance systems that employ either ultrasonic acoustic or Doppler-based radar systems are poorly suited for detecting the potential of a collision between rooftop mounted cargo and an overhead obstruction in situations where it would be most useful. On the one hand, ultrasonic acoustic systems often suffer from poor performance resulting from low signal directivity and a severely limited ability to filter out ambient noise, the combination of which leads to either too many false-positives (i.e. an indication of a possible collision that is not a real risk) or too many errors (i.e. not providing a suitable indication of an actual collision risk). On the other hand, Doppler-based radar systems perform poorly at low vehicle speeds and/or when the vehicle is stationary, which are common circumstances around which collisions between rooftop mounted cargo and an overhead obstruction occur.

By contrast, aspects of the present invention provide systems and methods for reducing the risk of a collision between rooftop mounted cargo and overhead obstructions by providing sub-systems for detecting overhead obstructions and warning drivers and, if present, passengers in vehicles when there is a risk of a collision. In accordance with some aspects of the invention methods are provided for detecting and evaluating the radar measurements to determine the risk of a collision between rooftop mounted cargo and overhead obstructions. Rooftop mounted cargo includes a range of items including, but not limited to, recreational equipment (e.g. bicycles, skies, snowboards, canoes, kayaks, surfboards, etc.), cargo boxes, building materials, appliances, luggage, animal cages and anything else that someone may want to transport on the roof of a vehicle.

Generally, a system provided in accordance with aspects of the invention includes a radar-based detector and a user interface unit that co-operate to detect and signal drivers (and passengers if present) of the risk of a collision between rooftop mounted cargo and an overhead obstruction. More specifically, the radar-based detector is provided to detect the presence of overhead obstructions that pose a collision risk to rooftop mounted cargo. The user interface unit is connected to the radar-based detector for receiving detection information from the radar-based detector and subsequently warning drivers and, if present, passenger(s) in the vehicle when there is a risk of a collision between rooftop mounted cargo and a detected overhead obstruction.

Some embodiments in accordance with aspects of the invention includes a radar-based detector having a forward or rear radar sensor that includes at least one antenna with a specifically shaped beam pattern (i.e. having a specifically shaped lobe) generally conforming to a very specific space proximate to the vehicle in which the potential for a collision exists. In more specific embodiments, the radar-based detector includes multiple sensors with corresponding multiple antennas, each with a specifically shaped beam pattern (i.e. having a specifically shaped lobe) generally conforming to a respective very specific space proximate to the vehicle in which the potential for a collision exists. In some other embodiments, the radar-based detector also includes a cargo radar sensor for detecting the presence or absence of rooftop mounted cargo above a vehicle. In some other embodiments, the radar-based detector also includes a forward radar sensor for detecting an object that is in a driver's forward line of sight, so that no alarm signal is provided when the object is in the driver's forward line of sight. In some embodiments the radar-based detector is configured to periodically measure the distance between a point on a vehicle and an overhead obstruction located in the path of travel of the rooftop mounted cargo, while in other embodiments simply the presence of overhead obstructions is determined. Additionally, as will be described below, similar features may also be optionally provided for the rear of a vehicle.

Additionally and/or alternatively, aspects of the invention can be embodied in the from of a computer program product that is accessible from a computer-usable or computer-readable medium providing program code for use by or in connection with a computer or any instruction execution system. From the purpose of this description, a computer-usable or computer readable medium can be any non-transitory, tangible medium that can contain, store, communicate, propagate, or transport the program for use by, or in connection with, the instruction execution system, apparatus, or device.

Examples of a computer-readable medium include a semiconductor and/or solid-state memory, magnetic tape, a removable computer diskette, a random access memory (RAM), a read-only memory (ROM), a rigid magnetic disk and an optical disk. Current examples of optical disks include, without limitation, compact disk-read only memory (CD-ROM), compact disk-read/write(CD-R/W) and DVD.

A computer-readable medium can be an electronic, magnetic, optical, electromagnetic, infrared, or semiconductor system (or apparatus or device) or a propagation medium. Examples of a computer-readable medium include a semiconductor and/or solid-state memory, magnetic tape, a removable computer diskette, a random access memory (RAM), a read-only memory (ROM), a rigid magnetic disk and an optical disk. Current examples of optical disks include, without limitation, compact disk-read only memory (CD-ROM), compact disk-read/write (CD-R/W) and DVD.

In accordance with aspects of the invention, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Additionally and/or alternatively, in accordance with aspects of the invention, a data processing system suitable for storing and/or executing program code will include at least one processor integrated with memory elements through a system bus.

Input/output (i.e. I/O devices)—including but not limited to keyboards, touch-pads, displays, pointing devices, etc.— can be coupled to the system either directly or through intervening I/O controllers.

Network adapters may also be coupled to the system to enable communication between multiple data processing systems, remote printers, or storage devices through intervening private or public networks. Modems, cable modems and Ethernet cards are just a few of the currently available types of network adapters.

Figure 1B:
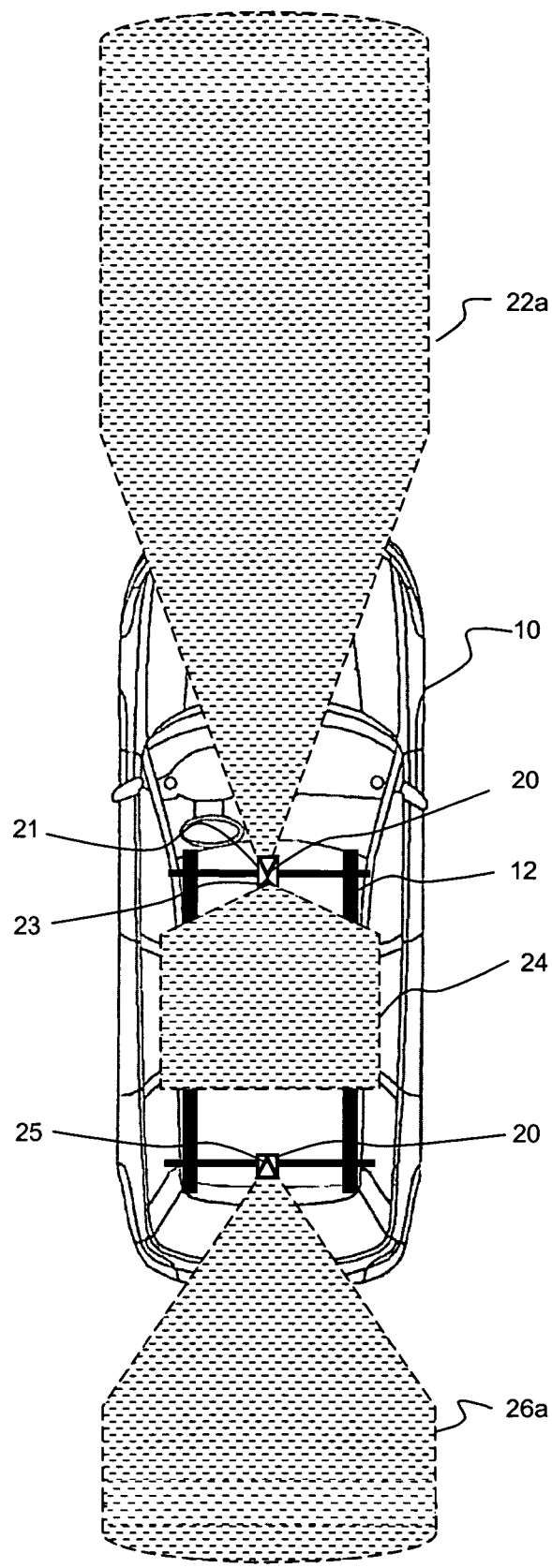
FIG. 1B is a top view schematically showing the collision avoidance system and some of the zones and corresponding antenna beam patterns shown in FIG. 1A in accordance with aspects of the invention.

Referring to FIGS. 1A and 1B, shown are schematic drawings of a collision avoidance system 20 for a vehicle 10 and a number of associated zones and corresponding antenna beam patterns around the vehicle 10 in accordance with aspects of the invention. More specifically, the vehicle 10 includes a roof-rack 12 onto which rooftop mounted cargo can be secured. For the sake of an illustrative example only, a bicycle 11 is shown secured to the roof-rack 12 in FIG. 1A. Moreover, those skilled in the art will appreciate that other devices (e.g. bungee cords, ropes, chains, clamps, bolts, etc.) may be used to secure cargo above a vehicle and that the scope of the claims is in no way limited to the structure provided by roof-racks.

With specific reference to FIG. 1A, in order to provide a clear description of the invention the space around the vehicle 10 has been divided into two primary zones. The first is an Elevated Vehicle Zone (EVZ) and the second is a Driver Line-Of-Sight Zone (DLOSZ). The EVZ is defined as the space above a plane defined by the roof of the vehicle, while the DLOSZ is defined as the space below the plane defined by the roof of the vehicle.

With reference to both FIGS. 1A and 1B, the collision avoidance system 20 includes a forward radar sensor 21 and an optional cargo radar sensor 23 that are collocated and mounted at the front end of the roof of the vehicle 10. More specifically, in this particular embodiment the forward radar sensor 21 and the cargo senor 23 are housed in a single forward unit 20a that is securely fixed to a front rail 12a of the roof-rack 12. As shown in FIG. 1B, in this particular embodiment, the forward unit 20a is located approximately in the middle of the front rail 12a. The collision avoidance system 20 also includes an optional rear radar sensor 25 that is located at the rear end of the roof of the vehicle 10. More specifically, in this particular embodiment the rear radar sensor 25 is housed in a rear unit 20b that is securely fixed to a back rail 12b of the roof-rack 12. As shown in FIG. 1B, in this particular embodiment, the rear unit 20b is located approximately in the middle of the back rail 12b. Although the forward and rear units 20a and 20b are mounted so that they are approximately centered on the roof of the vehicle 10, in other embodiments the locations of such units may be different. As such, it would be understood by those skilled in the art that the antenna beam radiation patterns might also be different from those that are described in more detail below.

Additionally and/or alternatively, the sensors 21, 23 and 25 may be mounted directly to the roof of a vehicle using one or more magnetic coupling devices strong enough to secure the sensors 21, 23 and 25 in place.

With reference to the more general description above, the forward radar sensor 21, the cargo radar sensor 23 and the rear radar sensor 25 are included in the radar-based detector for the collision avoidance system 20. The collision avoidance system 20 also includes a user interface unit (not shown in FIGS. 1A and 1B, but shown in FIG. 5) that is preferably mounted within the vehicle 10 and is communicatively connected to the detection system as noted previously. Moreover, those skilled in the art will appreciate that the collision avoidance system 20 may be supported by a combination of hardware, software and firmware, in addition to mechanical structures for securing elements of the collision avoidance system in place. However, only those elements required to describe specific aspects of the invention have been illustrated in FIGS. 1A and 1B.

The forward radar sensor 21, being a radar system, includes at least one antenna that transmit electromagnetic pulses into two separate specifically shaped beam patterns 22a and 22b. The first beam pattern 22a is radiated into the space in front of the vehicle in the EVZ to sense overhead obstructions that pose a collision risk to the rooftop mounted cargo. Accordingly, the first beam pattern 22a has a maximum height that is approximately the same as the maximum height of the cargo (e.g. bicycle 11) mounted above the vehicle 10; and, as will be described below in some embodiments the maximum height of the beam pattern 22a can either be fixed or adjustable. The second beam pattern 22b is optional and is radiated into the space in front of the vehicle in the DLOSZ. The beam patterns 22a and 22b are preferably wide beams conforming to the approximate width of the vehicle 10, so as not to detect obstructions that are not in the forward path of the vehicle 10, thereby limiting the number of false positives that may be produced. The beam patterns 22a and 22b can be created using a planar patch antenna array or another suitable antenna type known to those skilled in the art. In some embodiments, the precise location of an object is not required and at most only range and/or presence information may be required. The use of the forward radar sensor 21 is described in detail below with reference to FIGS. 4A and 4B.

The optional cargo radar sensor 23, being a radar system, includes at least one antenna that transmits electromagnetic pulses into a specifically shaped beam pattern 24. The cargo radar sensor 23 is used to at least detect the presence or absence of rooftop mounted cargo. Accordingly, the beam pattern 24 is a wide beam lobe having a maximum height that is approximately the same as the maximum expected height of cargo (e.g. bicycle 11) mounted above the vehicle 10, a width that is approximately the same as the width of the vehicle and a depth that does not extend beyond the rear of the roof of vehicle 10. The use of the cargo radar sensor 23 is described in detail below with reference to FIG. 3.

Additionally and/or alternatively, in some embodiments the maximum height of the beam pattern 24 can either be fixed or adjustable. Additionally and/or alternatively, the cargo radar sensor 23 can be adapted to detect the approximate height of rooftop mounted cargo and subsequently adjust the maximum height of the beam pattern 24. In such embodiments, the cargo radar sensor may also include a low-power "pencil-beam" radar (not shown) that scans cargo, initially detected using the beam 24, to provide an estimate of the dimensions of the rooftop mounted cargo, that in turn may be used to adjust the beam pattern 24.

The optional rear radar sensor 25, being a radar system, includes at least one antenna that transmit electromagnetic pulses into two separate specifically shaped beam patterns 26a and 26b. The first beam pattern 26a is radiated into the space behind the vehicle in the EVZ to sense overhead obstructions that pose a collision risk to the rooftop mounted cargo, when the vehicle 10 moves in the reverse direction. Accordingly, the first beam pattern 26a has a maximum height that is approximately the same as the maximum height of the cargo (e.g. bicycle 11) mounted above the vehicle 10; and, as similar to that described above in some embodiments the maximum height of the beam pattern 26a can either be fixed or adjustable. The second beam pattern 26b is optional and is radiated into the space behind the vehicle in the DLOSZ. The beam patterns 26a and 26b are preferably wide beams conforming to the approximate width of the vehicle 10, so as not to detect obstructions that are not in the reverse path of the vehicle 10, thereby limiting the number of false positives that may be produced. The beam patterns 26a and 26b can be created using a planar patch antenna array or another suitable antenna type known to those skilled in the art.

Figure 2:
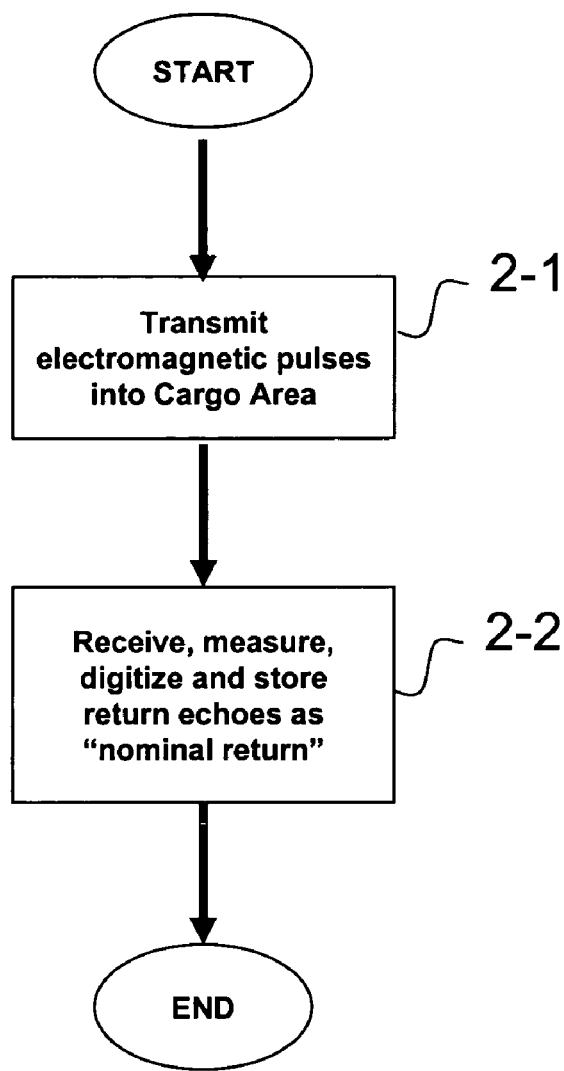
FIG. 2 is a flow chart illustrating a method of calibrating a radar sensor in accordance with aspects of the invention.

FIG. 2 is a flow chart illustrating a method of calibrating a radar sensor in accordance with aspects of the invention. Calibration of a radar sensor is preferable after a collision avoidance system in accordance with aspects of the invention has been installed. Calibration may help to reduce errors made by the collision avoidance system during normal use. The method described with reference to FIG. 2 is specific to an example method that may be employed for the cargo radar sensor 25. However, those skilled in the art will appreciate that such a method may be adapted and employed for any one of the radar systems included in a collision avoidance system in accordance with aspects of the invention.

The calibration steps may also be routinely repeated in between uses to ensure optimal performance of the collision avoidance system. During the calibration steps it is assumed that there are no targets (e.g. cargo such as recreational equipment or cargo boxes, building materials) in the space to be monitored. However, the space to be monitored by the cargo radar sensor 25 (e.g. above a vehicle in the vicinity of the roof-rack 12) should contain within it the major features that are always going to be present, such as the roof-rack 12 or other structures that are normally present, including without limitation features of the roof. Those skilled in the art will also appreciate that the calibration steps should be performed every time there is a significant change affecting the layout of the major features in the space.

Starting at step 2-1, the method includes transmitting electromagnetic pulses into the empty space to be monitored. At step 2-2, the method includes receiving, measuring, digitizing and storing return echoes (i.e. reflections of the electromagnetic pulses) stored as "nominal return data". That is, the nominal return data includes the return echoes from the empty space, which represent the clutter return inherent to the space.

Figure 3:
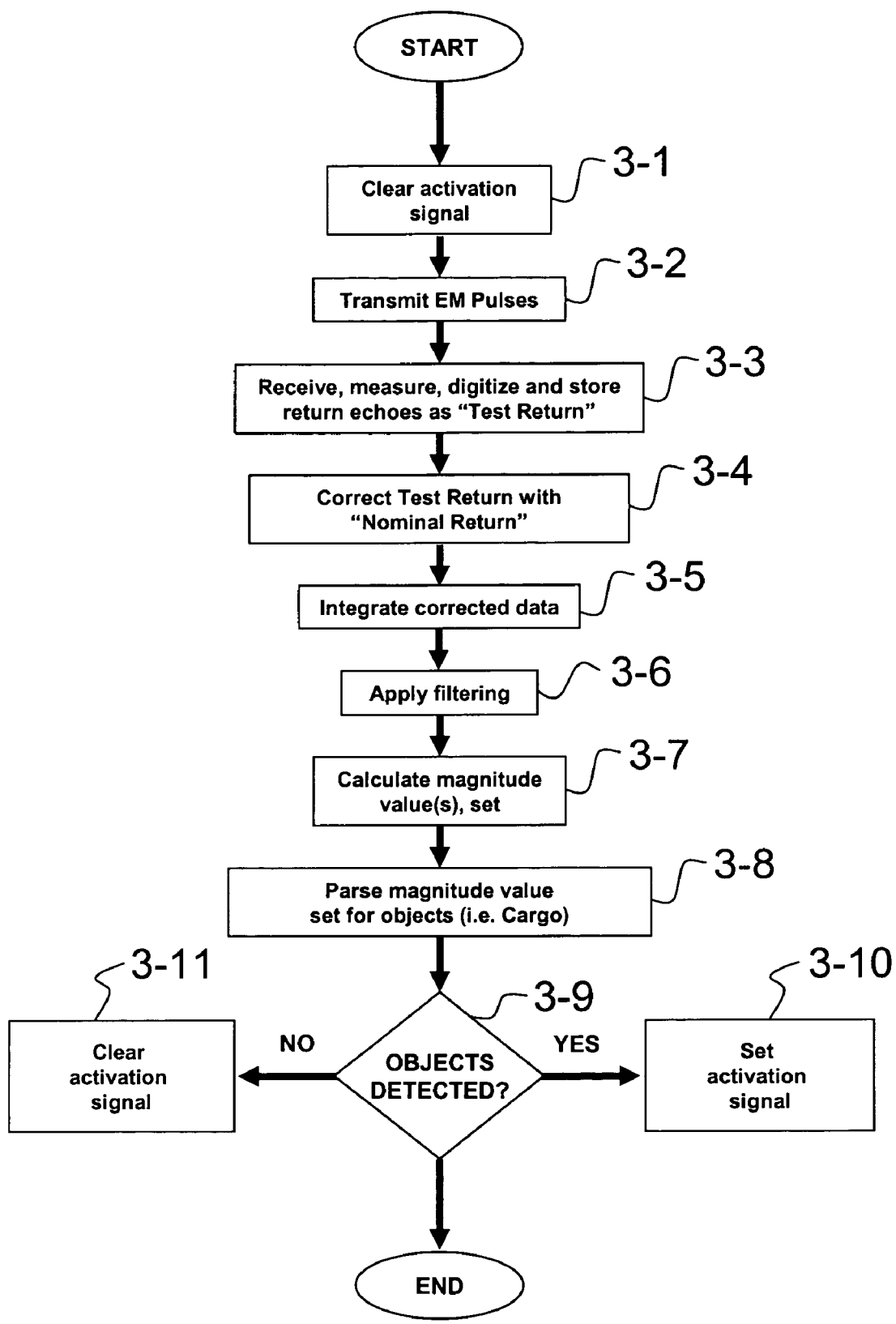
FIG. 3 is a flow chart illustrating a method of detecting the presence of rooftop mounted cargo and providing an activation signal in accordance with aspects of the invention.

Once the nominal return data is known, the cargo radar sensor 25 can be used for normal intended operations. As noted above, the role of the cargo radar sensor 25 is to detect the presence or absence of cargo above the vehicle 10. FIG. 3 is a flow chart illustrating a method of detecting the presence of rooftop mounted cargo and providing an activation signal in accordance with aspects of the invention. The activation signal can be used to control the mode of operation for the collision avoidance system 20. If the cargo radar sensor 25 does not detect cargo above the vehicle 10, the activation signal is cleared and the collision avoidance system 20 may enter a stand-by or power-saving mode. On the other and, if the cargo radar sensor 25 detects the presence of cargo, the activation signal is set and the collision avoidance system 20 is activated. In other words, the activation signal as set and/or cleared by the cargo radar sensor 25 serves as an on/off switch for the collision avoidance system.

Starting at step 3-1, the method includes clearing the activation signal. At step 3-2, the method includes transmitting electromagnetic pulses into the space to be monitored, which at this point may or may not be empty. At step 3-3, the method includes receiving, measuring, digitizing and storing return echoes (i.e. reflections of the electromagnetic pulses) stored as "test return data". That is, the test return data includes the return echoes from the space, which may or may not be empty.

Step 3-4 of the method includes correcting the test return data with the nominal return data. In some embodiments correcting the test return data with the nominal return data includes subtracting the nominal return data from the test return data or dividing the test return data by the nominal return data. At steps 3-5, the method includes integrating the corrected test return data. In effect, the integration can be simplified to a straight-forward addition of the corrected test return data. Alternatively, a weighted average can also be calculated. The thermal and ambient noise in the corrected signals is substantially uncorrelated with respect to that in other corrected signals, while the reflection components will be strongly correlated. There will thus be an improvement seen in the received signal-to-noise ratio (SNR) by adding the signals together (i.e. integrating).

At step 3-6, the method includes processing the integrated test inverse filters to create corresponding conditioned return data. The inverse filters may be designed as either Finite Impulse Response (FIR) or Infinite Impulse Response (IIR) filters. Subsequently, at step 3-7, the method includes calculating a magnitude value set from the conditioned test return data.

At step 3-8, the method includes using signal samples of the magnitude value set, to make a comparison to an energy threshold to identify potential targets (i.e. in this case cargo). Samples above the energy threshold indicate that targets are present in the space being monitored. That is cargo is present above the vehicle 10. The samples that are above the energy threshold are termed target indicators.

It is possible that there are no targets in the space and thus there should not be any samples above the energy threshold. Accordingly, at step 3-9 of the method includes determining whether or not there are any target indicators in the magnitude value set. If there are no target indicators (no path, step 3-9) then the method proceeds to step 3-11 in which the activation signal is cleared. If target indicators are present (yes path, step 3-9) the activation signal is set in step 3-10.

Figure 4A:
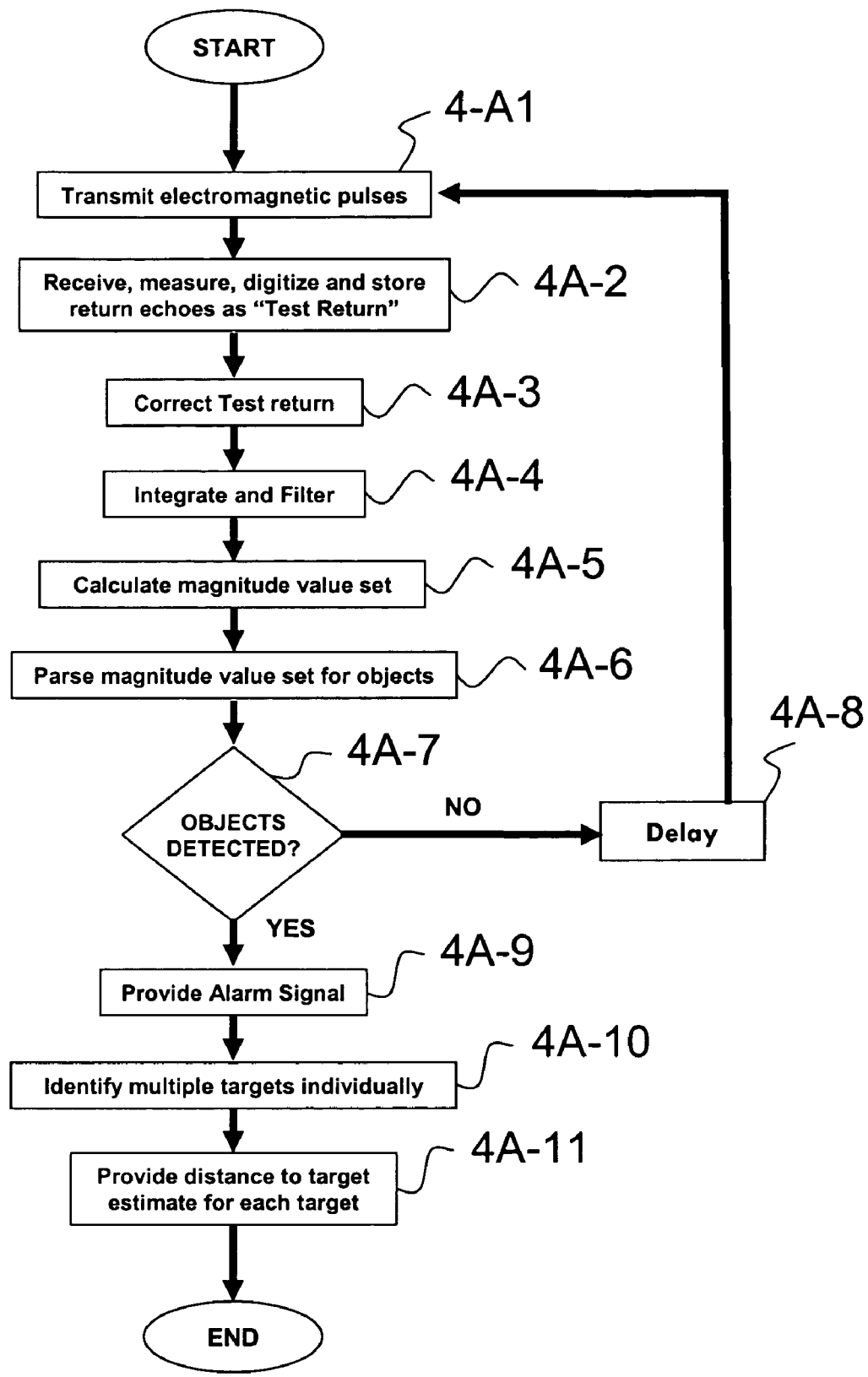
FIG. 4A is a flow chart illustrating a first method of determining the risk of a collision between rooftop mounted cargo and an overhead obstruction in accordance with aspects of the invention.
Figure 4B:
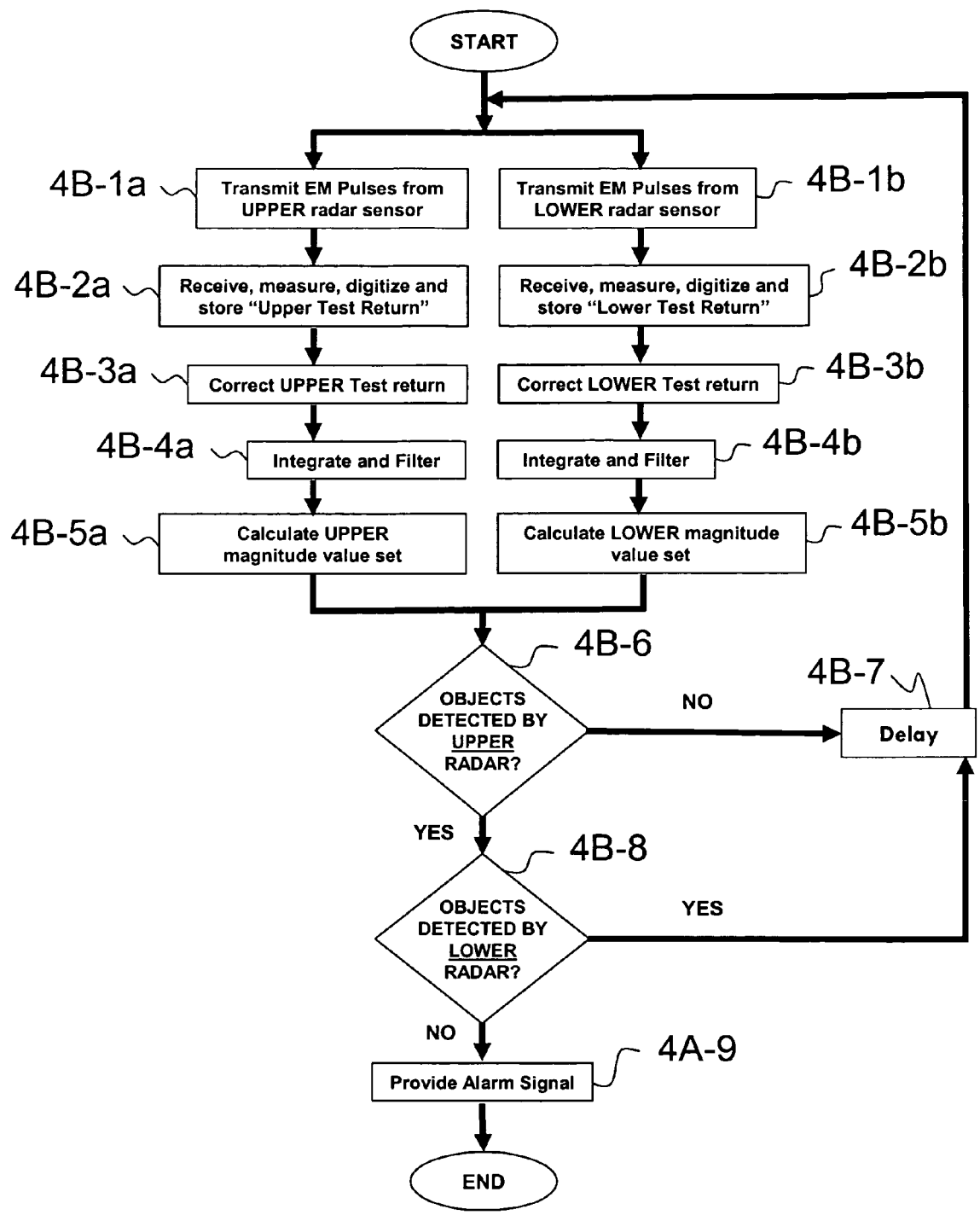
FIG. 4B is a flow chart illustrating a second method of determining the risk of a collision between rooftop mounted cargo and an overhead obstruction in accordance with aspects of the invention.

In accordance with some aspects of the invention, when the activation signal is set, meaning that cargo is present above the vehicle, the collision avoidance system 20 will enter a nominal mode of operation. FIGS. 4A and 4B provide flow charts for first and second methods of determining the risk of a collision between rooftop mounted cargo and an overhead obstruction in accordance with aspects of the invention. The difference between the first and second methods is that the first method (illustrated using the flow chart shown in FIG. 4A) only determines the presence or absence of overhead obstructions in very specific portions of the EVZ, while the second method (illustrated using the flow chart shown in FIG. 4B) includes steps for determining if overhead obstruction(s) detected in the EVZ extend down into the DLOSZ. In accordance with the second method no alarm signal is provided if the overhead obstruction(s) extend down into the DLOSZ, since it is assumed that a driver would be able to see such obstructions and in turn not wish to drive into them.

Referring first to FIG. 4A, starting at step 4A-1, the first method includes transmitting electromagnetic pulses into the space to be monitored. In accordance with this particular embodiment the space to be monitored includes a specific portion of the EVZ (e.g. with reference to FIGS. 1A and 1B, either directly in front or directly behind the vehicle 10 via beams 22a or 26a). At step 4A-2, the method includes receiving, measuring, digitizing and storing return echoes (i.e. reflections of the electromagnetic pulses) stored as "test return data". That is, the test return data includes the return echoes from the space, which may or may not be empty.

Step 4A-3 of the method includes correcting the test return data with the nominal return data. In some embodiments correcting the test return data with the nominal return data includes subtracting the nominal return data from the test return data or dividing the test return data by the nominal return data. At steps 4A-4, the method includes integrating and filtering the test return data as described above with reference to FIG. 3. Subsequently, at step 4A-5, the method includes calculating a magnitude value set from the conditioned test return data.

At step 4A-6, the method includes using signal samples of the magnitude value set, to make a comparison to an energy threshold to identify potential targets (i.e. in this case cargo). Samples above the energy threshold indicate that targets are present in the space being monitored.

It is quite possible that there are no targets in the space and thus there should not be any samples above the energy threshold. Accordingly, at step 4A-7 of the method includes determining whether or not there are any target indicators in the magnitude value set. If there are no target indicators (no path, step 4A-7) then the method proceeds to step 4A-8 in which a delay in enforced before electromagnetic pulses are transmitted again starting at step 4A-1. On the other hand, if target indicators are present in the magnitude value set (yes path, step 4A-7) the method proceeds to step 4A-9.

At step 4A-9, the method includes providing an alarm signal to the driver and, if present, passenger(s) of the vehicle. Additionally and optionally, the method also includes steps 4A-10 and 4A-11 in which multiple targets are individually identified and an approximate distance to each target is calculated from the test return data, respectively.

Turning to FIG. 4B, shown is a flow chart illustrating method steps for the second method. As noted above, the second method includes steps for determining if overhead obstruction(s) detected in the EVZ extend down into the DLOSZ. In accordance with the second method no alarm signal is provided if the overhead obstruction(s) extend down into the DLOSZ, since it is assumed that a driver would be able to see such obstructions and in turn not wish to drive into them.

In this particular embodiment, the second method includes radar sweeps of specific portions of the EVZ and corresponding lower portions in DLOSZ. For example, as shown in FIGS. 1A and 1B the forward radar sensor 21 is configured to provide first and second beam patterns 22a and 22b for the corresponding spaces directly in front of the vehicle 10 in the EVZ and the DLOSZ, respectively. As such, the method of performing the radar sweeps can be identical in some embodiments of the invention. To that end, the second method, as shown in FIG. 4B, includes two parallel branches for sweeping the EVZ and DLOSZ simultaneously. The first branch includes steps 4B-1a to 4B-5a, and the second branch includes steps 4B-1b to 4B-5b, and the five steps in each branch are identical to the steps 4A-1 to 4A-5 described above with reference to FIG. 4A. Accordingly, for the sake of brevity, a description for the steps 4B-1a to 4B-5a and 4B-1b to 4B-5b will not be repeated.

At step 4B-6, the method, having been performed to obtain test return data for the spaces in the EVZ and DLOSZ, further includes determining whether or not there are overhead obstructions in the space within the EVZ. If there are no target indicators (no path, step 4B-6) then the method proceeds to step 4B-7 in which a delay in enforced before electromagnetic pulses are transmitted again starting at steps 4B-1a and 4B-1b. On the other hand, if target indicators are present in the magnitude value set (yes path, step 4B-6) the method proceeds to step 4B-8.

At step 4B-8, the method includes determining whether or not there are overhead obstructions in the space within the EVZ extending into the DLOZ. If there are target indicators (yes path, step 4B-8) then the method proceeds to step 4B-7 in which a delay in enforced before electromagnetic pulses are transmitted again starting at steps 4B-1a and 4B-1b. On the other hand, if no target indicators are present in the magnitude value set (no path, step 4B-8) the method proceeds to step 4B-9. At step 4B-9, the method includes providing an alarm signal to the driver and, if present, passengers of the vehicle.

Figure 5:
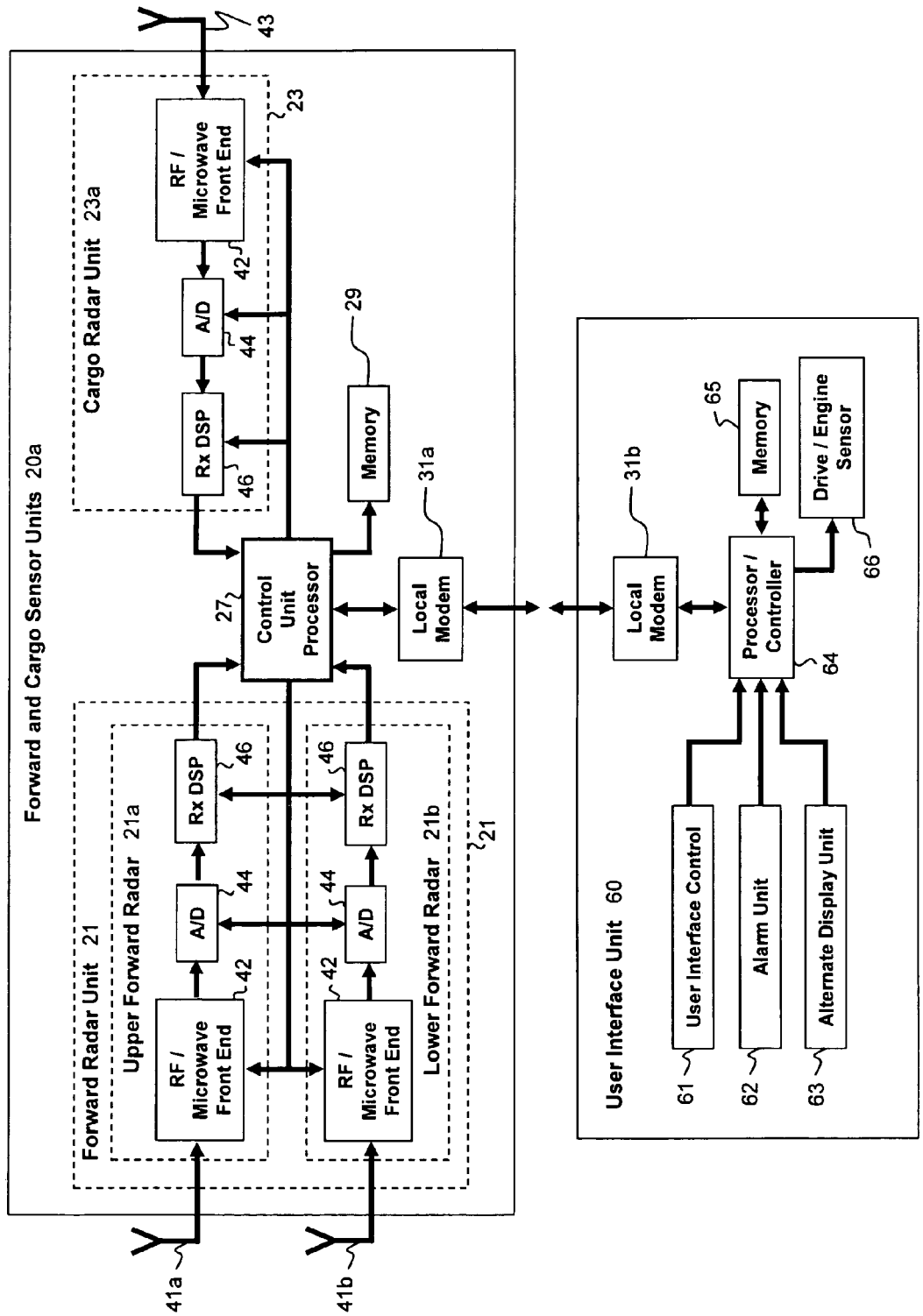
FIG. 5 is a schematic drawing of a collision avoidance system in accordance with aspects of the invention.

FIG. 5 is a functional block diagram of components included in the collision avoidance system 20 partially illustrated in FIGS. 1A and 1B, in accordance with one particular embodiment of the invention. More specifically, FIG. 5 includes the forward unit 20a and a user interface unit 60, which is preferably located within the vehicle where it is accessible to the driver and a passenger if present in the vehicle.

Those skilled in the art will appreciate that the user interface unit 60 includes a suitable combination of structural elements, mechanical systems, hardware, firmware and software arranged to support the function and operation of the user interface unit 60, and, for the sake of simplicity, portions of the user interface unit 60 have been divided into functional units in order to conveniently describe aspects of this specific embodiment. To that end, the user interface unit 60 includes a processor (or controller) 64, a user interface control 61, an alarm unit 62, an alternate display unit 63, a local modem 31b, a memory 65 and drive/engine sensor 66.

In some embodiments, the processor 64, interface control 61, local modem 31b and memory 63 are included as a computer program product including computer usable program code for determining a risk of a potential collision between an object and cargo mounted on the roof of the vehicle. The computer usable program code including program instructions for: processing the information gathered by the radar-based detector to determine if an object is within the space covered by the first antenna beam pattern; and warning a user, by way of the alarm unit 62 or alternate display 63, that a risk of a potential collision is present when an object is determined to be in the space covered by the first antenna beam pattern.

Each of the user interface control 61, the alarm unit 62, the alternate display unit 63, the local modem 31b, the memory 65 and the drive/engine sensor 66 are communicatively connected to the processor 64. The processor 64 is configured to manage the operations of the aforementioned components as well as other supporting features that have not been specifically illustrated.

The memory 65 is provided to store computer readable instructions that the processor 64 may use during operation and intermediate data produced and/or employed by the processor 64 and/or other elements of the user interface unit 60. The local modem 31b is used to connect the user interface unit 60 with the senor units (e.g. forward radar sensor unit 20a). In some embodiments, the local modem 31b includes without limitation, simple wire connections, respective optical fiber modems, wireless modems, Universal Serial Bus (USB) ports, Ethernet modems or the like, in order to establish a data link with any one of the sensor units.

The drive/engine sensor 66 is provided to optionally detect whether or not the engine of the vehicle is running. In some embodiments, when the vehicle is not running, the processor 64 disables the collision avoidance system 20 and places the collision avoidance system in a stand-by mode in order to save power.

Additionally and/or alternatively, the user interface unit 61 includes a magnetron sensor (not shown) for providing a signal indicative as to whether or not the vehicle is moving, and in which direction. In some embodiments, when the vehicle is not moving, the processor 64 disables the collision avoidance system 20 and places the collision avoidance system in a stand-by mode in order to save power. In some embodiments, when the vehicle is moving forward, the processor 64 enables the forward sensor 21 and disables the rear sensor 25 in order to conserve power. A magnetron is known to those skilled in the art to be a motion sensor that is designed to detect displacement of the sensor relative to a static state.

The user interface control 61, alarm unit 62 and alternate display unit 63 provide the interface between a user and the collision avoidance system 20. The user interface control 61 is provided to allow a user to manipulate the collision avoidance system (e.g. turn the collision avoidance system on/off, program special features, etc.). The alarm unit 62 is provided to produce an audible and/or visible alarm signal to warn a user of the risk of a collision. The alternative display unit 63 is optionally provided as another link between a user and the collision avoidance system 20 on which information including, but not limited to, the status of the collision avoidance system 20 can be displayed.

As noted above the forward unit 20a includes the forward radar sensor 21 and the cargo radar sensor 23. However, those skilled in the art will appreciate that the forward unit 20a also includes a suitable combination of structural elements, mechanical systems, hardware, firmware and software arranged to support the function and operation of the forward unit 20a, and, for the sake of simplicity, portions of the forward unit 20a have been divided into functional units in order to conveniently describe aspects of this specific embodiment. Thus, in addition to the forward radar sensor 21 and the cargo radar sensor 23, the forward unit includes a control unit 27, a memory 29 and a local modem 31a.

With the forward unit 20a the forward radar sensor 21 includes an upper forward radar unit 21a and a lower forward radar unit 21b. Similarly, the cargo radar sensor 23 includes a cargo radar unit 23a. The radar units 21a, 21b and 23a are all similarly configured. Accordingly, for the sake of brevity components common to each of the radar units 21a, 21b and 23a share common reference indicia and only one of the radar units 21a will be described in detail below. Each of the radar units 21a, 21b and 23a are coupled to a corresponding antenna (or antenna array) 41a, 41b and 24, respectively, and to the control unit 27 as shown in FIG. 5. The control unit 27 is functionally coupled to the memory 29 and the local modem 31a. The local modem 31a is provided to enable communication with the user interface unit 60 as described above.

The upper forward radar 21a (and similarly as do the lower radar unit 21a and the cargo radar unit 23a) includes a Radio-Frequency (RF)/Microwave front-end 42, and Analog-to-Digital Converter 44 and a Receive Digital Signal Processor (Rx DSP) 46, which are connected in series between the antenna 41a and the control unit 27.

Figure 6:
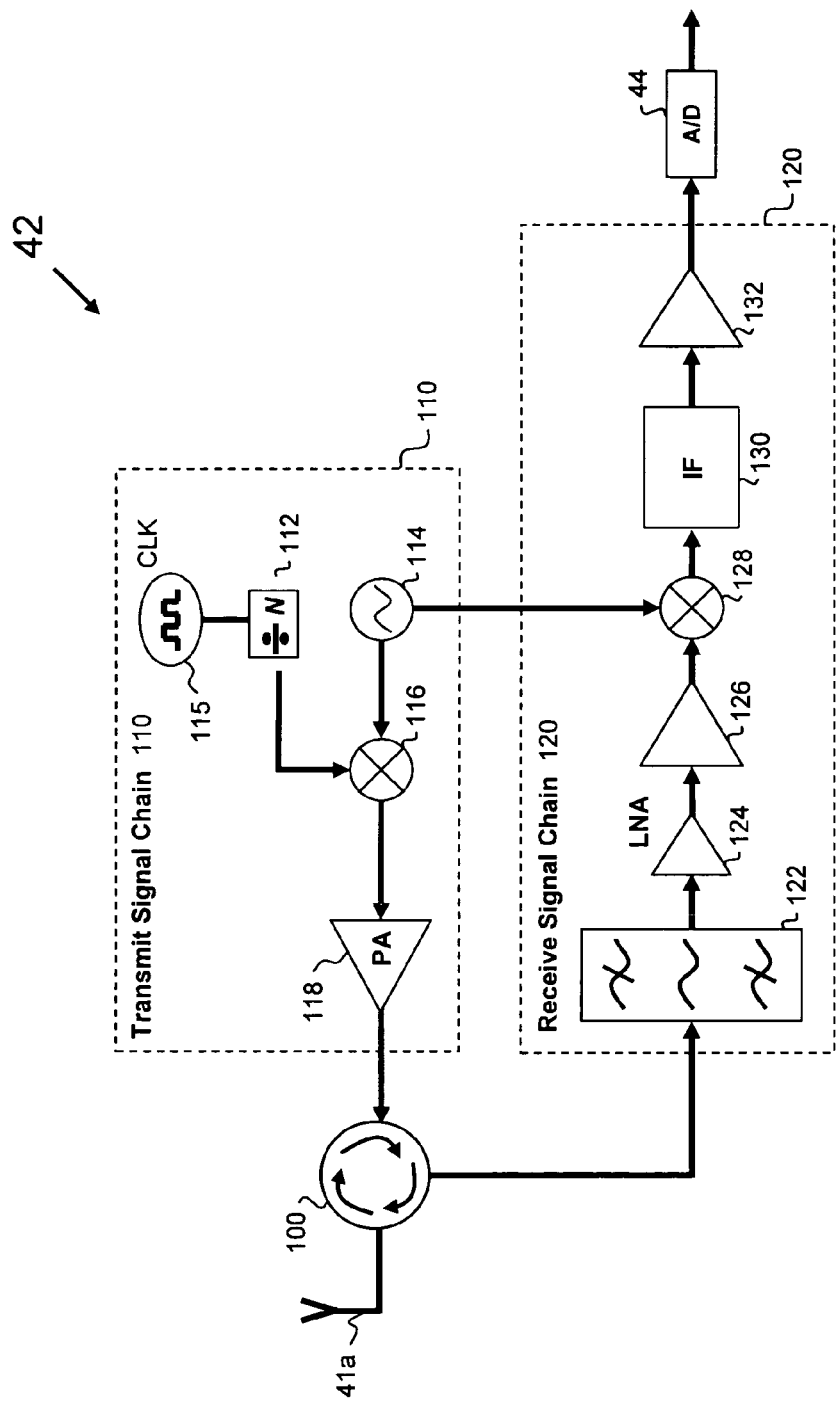
FIG. 6 is a schematic drawing of a radar transceiver suitable for use within the collision avoidance system in accordance with aspects of the invention.

FIG. 6 is a schematic drawing of a radar transceiver (i.e. RF/Microwave front end) 42 suitable for use within a collision avoidance system in accordance with aspects of the invention. The radar transceiver 42 includes a transmit signal chain 110 and a receive signal chain 120. Both the transmit signal chain 110 and the receive signal chain 120 are coupled through a circulator 100 to an antenna 41a. Again, in the present embodiment the antenna 41a is a patch antenna array designed to provide a wide bean pattern similar to that of wide beam pattern 22a shown in FIGS. 1A and 1B.

The transmit signal chain 110 includes an RF/microwave oscillator 114. An output of the oscillator 114 is coupled to a mixer/modulator 116. The mixer/modulator 116 is also coupled to receive an input from a divide-by-N pulse generator 112, which is itself coupled to receive a clock signal from a clock generator 115. The output of the mixer/modulator 116 is couple into a pre-transmission power amplifier 118 before being sent to the circulator 100.

In operation, the transmit signal chain 110 generates electromagnetic pulses to be transmitted by the antenna 41a. In one embodiment, each pulse would have a duration of about 5-20 ns and there would be 3-5 pulses transmitted per second. The pulse signal provided by the pulse generator 112 would typically have a period of about 200 ns. Thus, the duty cycle of the electromagnetic pulses in relation to the pulse repetition interval would be on the order of 1-5%. However, in alternative embodiments the duty cycle could be substantially larger or smaller. A short pulse is advantageous because it allows reflections from relatively close targets to be detected. If the pulse were too long, the reflections from relatively close targets would arrive before the pulse duration is over and consequently they would not be detected. The pulse repetition interval is chosen such that reflections due to one pulse will be received before transmission of the next pulse, while transmitting as many pulses as possible in order to maximize the amount of information and noise reduction available.

Accordingly, the role of the divide by N pulse generator 112 is to use the clock signal provided by the clock generator 115 to produce a pulse signal with an appropriate duty cycle and frequency. This signal is delivered to the mixer/modulator 116 to modulate an RF/microwave tone from the oscillator 114 with the pulse signal.

The receive signal chain 120 is coupled to receive an input from the antenna 41a via the circulator 100, and an input from the oscillator 114 of the transmit signal chain 110. The input from the circulator 110 is passed through a band pass filter 122. The output of the band pass filter 122 is in turn coupled in series to a low noise amplifier 124 and receive-side pre-amplifier 126. The output of the receive-side pre-amplifier 46 is coupled to a down-converter 128.

In series, after the down-converter 128, the receive signal chain 120 includes a filter 130, a post-amplifier 132, which is then coupled to the Analog-to-Digital Converter (A/D) 44, as originally shown in FIG. 5. The output of the A/D 44 is coupled into the receive DSP 46. The down-converter 128, also receives the input from the oscillator 114.

Additionally and/or alternatively, the output of the receive-side pre-amplifier 126 can be split into I and Q (i.e. in-phase and quadrature branches respectively) branches. The I and Q branches can be substantially identical to the remainder of the receive signal chain 110 described above. I-Q detection permits the subtraction of clutter from the raw return more effectively than other methods such as envelope detection. However, I-Q detection requires more complex hardware on the radar transceiver.

In operation the receive signal chain 110 receives and delivers the down-converted channels from the reflections received by the antenna 411a so that the reflections can be processed as described above.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above disclosure.

We claim:

1. A non-Doppler radar-based collision warning system for determining when there is a risk of a potential collision between an overhead obstruction and cargo mounted on a roof of a vehicle, the system comprising:
a non-Doppler radar-based detector including a forward radar sensor, mountable on a front portion of a vehicle, the forward radar sensor operable to emit electromagnetic pulses and receive subsequent pulse reflections in a specifically shaped first antenna beam pattern covering a first antenna beam pattern space so as to gather information about the presence of absence of objects within said first antenna beam pattern space covered by the first antenna beam pattern, said first antenna beam pattern space defined as a portion of the space above a plane approximately coplanar with the roof of the vehicle; and
a user interface unit connectable to the radar-based detector for receiving at least some of the information gathered by the radar-based detector, the user interface unit including an alarm unit and a computer program product comprising a portion of a memory including computer usable program code for determining the risk of collision between an object and cargo mounted on the roof of the vehicle, the computer usable program code including program instructions for:

processing the information gathered by the radar-based detector to determine if said object is within said first antenna beam pattern space; and warning a user that a risk of a potential collision is present when said object is determined to be in said first antenna beam pattern space;

wherein the user interface unit further comprises a drive/engine sensor for providing a signal indicative as to whether or not the engine of the vehicle is running, and wherein the computer usable program code also includes program instructions for:

processing the signal from the drive/engine sensor to determine whether or not the vehicle is running; and placing the collision avoidance system in a stand-by mode in order to save power when it is determined that the vehicle is not running.

2. A system according to claim 1 wherein the user interface further comprises an alternate display for providing another link between a user and the system.

3. A system according to claim 1 wherein the computer program product includes the operability to perform the functions of a local modem providing connectivity between the user interface unit and at least one component of the radar-based detector.

4. A system according to claim 3, wherein the local modem includes at least one of a simple wire connection, an optical fibre modem, a wireless modem, a Universal Serial Bus (USB) port, an Ethernet modem, in order to establish a data link with at least one component of the radar-based detector.

5. A computer program product comprising:

a computer program product comprising a portion of a memory including computer usable program code for determining the risk of collision between an object and cargo mounted on the roof of the vehicle using a non-Doppler radar-based detector, the computer usable program code including program instructions for:

using said non-Doppler radar-based detector, transmitting electromagnetic pulses using a specifically shaped first forward antenna beam pattern covering a first forward antenna beam pattern space, wherein said first forward antenna beam pattern space is defined as a portion of the space above a plane approximately coplanar with the roof of the vehicle;

receiving reflections of the transmitted electromagnetic pulses from said first forward antenna beam pattern space;

processing the information gathered by the radar-based detector to determine if said object is within said first forward antenna beam pattern space; and warning a user that a risk of potential collision is present when said object is determined to be in said first forward antenna beam pattern space;

wherein the computer usable program code further includes program instructions for:

transmitting electromagnetic pulses using a specifically shaped second forward antenna beam pattern covering a second forward antenna beam pattern space, wherein said second forward antenna beam pattern space is defined as a portion of the space below a plane approximately coplanar with the roof of the vehicle and in a driver's forward line of sight;

receiving reflections of the transmitted electromagnetic pulses from said second forward antenna beam pattern space covered;

processing the information gathered by said non-Doppler radar-based detector to determine if said object is within said second forward antenna beam pattern space; and not warning a user that a risk of a potential collision is present when said object is determined to be in said second forward antenna beam pattern space, irrespective of whether or not said object is also in said first forward antenna beam pattern space.

6. A computer program product comprising:

a computer program product comprising a portion of a memory including a computer usable program code for using a non-Doppler radar-based detector for determining the risk of collision between an object and cargo mounted on the roof of the vehicle, the computer usable program code including program instructions for:

using said non-Doppler radar-based detector, transmitting electromagnetic pulses using a specifically shaped first forward antenna beam pattern covering a first forward antenna beam space, wherein said first forward antenna beam pattern space is defined as a portion of the space above a plane approximately coplanar with the roof of the vehicle;

receiving reflections of the transmitted electromagnetic pulses from said first forward antenna beam pattern space covered;

processing the information gathered by the radar-based detector to determine if an object is within said first forward antenna beam pattern space; and warning a user that a risk of potential collision is present when an object is determined to be in said first forward antenna bema pattern space;

wherein the computer usable program code further includes program instructions for:

transmitting electromagnetic pulses using a specifically shaped cargo antenna beam pattern covering a cargo antenna beam pattern space, wherein said cargo antenna beam pattern space is defined as a portion of the space above a plane approximately coplanar with the roof of the vehicle where cargo may be mounted;

receiving reflections of the transmitted electromagnetic pulses from said cargo antenna beam pattern space;

processing the information gathered by said non-Doppler radar-based detector to determine if cargo is mounted on the roof of the vehicle; and placing the collision avoidance system in a stand-by mode in order to save power when it is determined that cargo has not been mounted on the roof of the vehicle.

7. A computer program product, comprising:

a computer program product comprising a portion of a memory including computer usable program code for determining the risk of collision between an object and cargo mounted on the roof of a vehicle using a non-Doppler radar-based detector, the computer usable program code including program instructions for:

using said non-Doppler radar-based detector, transmitting electromagnetic pulses using a specifically shaped first forward antenna beam pattern covering a first forward antenna beam pattern space, wherein said first forward antenna beam pattern space is defined as a portion of the space above a plane approximately coplanar with the roof of the vehicle;

receiving reflections of the transmitted electromagnetic pulses from said first forward antenna beam pattern space;

processing the information gathered by the radar-based detector to determine if said object is within said first forward antenna beam pattern space; and warning a user that a risk of potential collision is present when said object is determined to be in said first forward antenna beam pattern space;

wherein the computer usable program code further includes program instructions for:

transmitting electromagnetic pulses using a specifically shaped first rear antenna beam pattern covering a first rear antenna beam pattern space, wherein said first rear antenna beam pattern space is defined as a rear portion of the space above a plane approximately coplanar with the roof of the vehicle;

receiving reflections of the transmitted electromagnetic pulses from said first rear antenna beam pattern space;

processing the information gathered by the radar-based detector to determine if an object located at the rear of said vehicle is within said first rear antenna beam pattern space; and warning a user that a risk of a potential collision is present when said object located at the rear of said vehicle is determined to be in said first rear antenna beam pattern space;

wherein the computer usable program code further includes program instructions for:

transmitting electromagnetic pulses using a specifically shaped second rear antenna beam pattern covering a second rear antenna beam pattern space, wherein said second rear antenna beam pattern space is defined as a rear portion of the space below a plane approximately coplanar with the roof of the vehicle;

receiving reflections of the transmitted electromagnetic pulses from said second rear antenna beam pattern space;

processing the information gathered by said non-Doppler radar-based detector to determine if said object located at the rear of said vehicle is within said second rear antenna beam pattern space; and not warning a user that a risk of potential collision is present when said object located at the rear of said vehicle is determined to be in said second rear antenna beam pattern space, irrespective of whether of not said object located at the rear of said vehicle is also in said first rear antenna beam pattern space.

8. A non-Doppler radar-based collision warning system for determining when there is a risk of a potential collision between an overhead obstruction and cargo mounted on a roof of a vehicle, the system comprising:

a non-Doppler radar-based detector including a forward radar sensor, mountable on a front portion of a vehicle, the forward radar sensor operable to emit electromagnetic pulses and receive subsequent pulse reflections in a specifically shaped first antenna beam pattern covering a first antenna beam pattern space so as to gather information about the presence or absence of objects within said first antenna beam pattern space, said first antenna beam pattern space defined as a portion of the space above a plane approximately coplanar with the roof of the vehicle; and a user interfaces unit connectable to said non-Doppler radar-based detector for receiving at least some of the information gathered by said non-Doppler radar-based detector, the user interface unit including an alarm unit and a computer program product including computer usable program code for determining the risk of collision between an object and cargo mounted on the roof of the vehicle, the computer usable program code including program instructions for:

processing the information gathered by said non-Doppler radar-based detector to determine if said object is within said first antenna beam pattern space; and warning a user that a risk of a potential collision is present when said object is determined to be in said first antenna beam pattern space;

wherein the forward radar sensor is further operable to emit electromagnetic pulses and receive subsequent pulse reflections in a specifically shaped second antenna beam pattern covering a second antenna beam pattern space so as to gather information about the presence or absence of objects within said second antenna beam pattern space covered by the second antenna beam pattern, where said second antenna beam pattern space is defined as a portion of the space below a plane approximately coplanar with the roof of the vehicle and in a driver's forward line of sight; and wherein the computer usable program code also includes program instructions for:

processing the information gathered by said non-Doppler radar-based detector to determine if said object is within said second antenna beam pattern space; and not warning a user that a risk of potential collision is present when said object is determined to be in said second antenna beam pattern space, irrespective of whether or not said object is also in said first antenna beam pattern space.

9. A non-Doppler radar-based collision warning system for determining when there is a risk of a potential collision between an overhead obstruction and cargo mounted on a roof of a vehicle, the system comprising:

a non-Doppler radar-based detector including a forward radar sensor, mountable on a front portion of a vehicle, the forward radar sensor operable to emit electromagnetic pulses and receive subsequent pulse reflections in a specifically shaped first antenna beam pattern covering a first antenna beam pattern space so as to gather information about the presence or absence of objects within said first antenna beam pattern space, said first antenna beam pattern space defined as a portion of the space above a plane approximately coplanar with the roof of the vehicle; and a user interface unit connectable to said non-Doppler radar-based detector for receiving at least some of the information gathered by said non-Doppler radar-based detector, the user interface unit including an alarm unit and a computer program product including computer usable program code for determining the risk of collision between an object and cargo mounted on the roof of the vehicle, the computer usable program code including program instructions for:

processing the information gathered by said non-Doppler radar-based detector to determine if an object is within said first antenna beam pattern space; and warning a user that a risk of a potential collision is present when an object is determined to be in said first antenna beam pattern space;

wherein said non-Doppler radar-based detector further comprises:

a cargo radar sensor operable to emit electromagnetic pulses and receive subsequent pulse reflections in a specifically shaped second antenna beam pattern so as to gather information about the presence or absence of objects within a second antenna beam pattern space covered by the second antenna beam pattern, where said second antenna beam pattern space is defined as a portion of the space above a plane approximately coplanar with the roof of the vehicle where cargo may be mounted; and wherein the computer usable program code also includes program instructions for:
processing the information gathered by the radar-based detector to determine if cargo is mounted on the roof of the vehicle; and
placing the collision avoidance system in a stand-by mode in order to save power when it is determined that cargo has not been mounted on the roof of the vehicle.

10. A non-Doppler radar-based collision warning system for determining when there is a risk of a potential collision between an overhead obstruction and cargo mounted on a roof of a vehicle, the system comprising:

a non-Doppler radar-based detector including a forward radar sensor, mountable on a front portion of a vehicle, the forward radar sensor operable to emit electromagnetic pulses and receive subsequent pulse reflections in a specifically shaped first antenna beam pattern so as to gather information about the presence or absence of objects within the space covered by the first antenna beam pattern, the first antenna beam pattern is defined as a portion of the space above a plane approximately coplanar with the roof of the vehicle; and a user interface unit connectable to said non-Doppler radar-based detector for receiving at least some of the information gathered by said non-Doppler radar-based detector, the user interface unit including an alarm unit an a computer program product including computer usable program code for determining the risk of collision between an object and cargo mounted on the roof of the vehicle, the computer usable program code including program instructions for:
processing the information gathered by said non-Doppler radar-based detector to determine if an object is within the space covered by the first antenna beam pattern; and
warning a user that a risk of a potential collision is present when an object is determined to be in the space covered by the first antenna beam pattern;

wherein the user interface unit further comprises a magnetron sensor for providing a signal indicative as to whether or not the vehicle is moving, and wherein the computer usable program code also includes program instructions for:
processing the signal from the magnetron sensor to determine whether or not the vehicle is moving; and
placing the collision avoidance system in a stand-by mode in order to save power when it is determined that the vehicle is not moving.

11. A non-Doppler radar-based collision warning system for determining when there is a risk of a potential collision between an overhead obstruction and cargo mounted on a roof of a vehicle, the system comprising:

a non-Doppler radar-based detector including a forward radar sensor and a rear radar sensor, wherein said forward radar sensor is mountable on a front portion of a vehicle, said forward radar sensor operable to emit electromagnetic pulses and receive subsequent pulse reflections in a specifically shaped first forward antenna beam pattern so as to gather information about the presence or absence of objects within a first forward antenna beam pattern space covered by the first forward antenna beam pattern, said first forward antenna beam pattern space defined as a portion of the space above a plane approximately coplanar with the roof of the vehicle;

wherein said rear radar sensor is operable to emit electromagnetic pulses and receive subsequent pulse reflections in a specifically shaped first rear antenna beam pattern covering a first rear antenna beam pattern space so as to gather information about the presence or absence of objects within said first rear antenna beam pattern space, wherein said first rear antenna beam pattern space is defined as a portion of the space above a plane approximately coplanar with the roof of the vehicle and in a driver's rear line of sight;

wherein said rear radar sensor is further operable to emit electromagnetic pulses and receive subsequent pulse reflections in a specifically shaped second rear antenna beam pattern covering a second rear antenna beam pattern space so as to gather information about the presence or absence of objects within said second rear antenna beam pattern space, wherein said second rear antenna beam pattern space is defined as a portion of the space below a plane approximately coplanar with the roof of the vehicle and in a driver's rear line of sight; and a user interface unit connectable to said non-Doppler radar-based detector for receiving at least some of the information gathered by said non-Doppler radar-based detector, the user interface unit including an alarm unit and a computer program product comprising a portion of a memory including computer usable program code for determining the risk of collision between an object and cargo mounted on the roof of the vehicle, the computer usable program code including program instructions for:
processing the information gathered by said non-Doppler radar-based detector to determine if said object is within said first forward antenna beam pattern space; and
warning a user that a risk of a potential collision is present when said object is determined to be in said first forward antenna beam pattern space; and wherein the computer usable program code also includes program instructions for:
processing the information gathered by the radar-based detector to determine if an object located at the rear of said vehicle is within said first rear antenna beam pattern space; and
not warning a user that a risk of potential collision is present when said object located at the rear of said vehicle is determined to be in said second rear antenna beam pattern space, irrespective of whether or not the object is also in said first rear antenna beam pattern space.

12. A method of determining a risk of potential collision between an object and cargo mounted on the roof of the vehicle, using a non-Doppler radar-based detector, the method comprising:
transmitting electromagnetic pulses using a specifically shaped first forward antenna beam pattern covering a first forward antenna beam pattern space, wherein said first forward antenna beam pattern space is defined as a portion of the space above a plane approximately coplanar with the roof of the vehicle;
receiving reflections of the transmitted electromagnetic pulses from said first forward antenna beam pattern space;

processing the reflections to determine if said object is within said first forward antenna beam pattern space; and warning a user that a risk of a potential collision is present when said object is determined to be in said first forward antenna beam pattern space;

said method further comprising:

transmitting electromagnetic pulses using a specifically shaped second forward antenna beam pattern covering a second forward antenna beam pattern space, wherein said second forward antenna beam pattern space is defined as a portion of the space below a plane approximately coplanar with the roof of the vehicle and in a driver's forward line of sight;

receiving reflections of the transmitted electromagnetic pulses from said second forward antenna beam pattern space;

processing information gathered by the radar-based detector to determine if said object is within said second forward antenna beam pattern space; and not warning a user that a risk of a potential collision is present when said object is determined to be in said second forward antenna beam pattern space whether or not said object is also in said first forward antenna beam pattern space.

13. A method according to claim 12 further comprising:

transmitting electromagnetic pulses using a specifically shaped cargo antenna beam pattern covering a cargo antenna beam pattern space, wherein said cargo antenna beam pattern space is defined as a portion of the space above a plane approximately coplanar with the roof of the vehicle where cargo may be mounted;

receiving reflections of the transmitted electromagnetic pulses from said cargo antenna beam pattern space;

processing information gathered by the radar-based detector to determine if cargo is mounted on the roof of the vehicle; and placing the collision avoidance system in a stand-by mode in order to save power when it is determined that cargo has not been mounted on the roof of the vehicle.

14. A method according to claim 12 further comprising:

transmitting electromagnetic pulses using a specifically shaped first rear antenna beam pattern covering a first rear antenna beam pattern space, wherein said first rear antenna beam pattern space is defined as a rear portion of the space above a plane approximately coplanar with the roof of the vehicle;

receiving reflections of the transmitted electromagnetic pulses from said first rear antenna beam pattern space;

processing information gathered by the radar-based detector to determine if an object located at the rear of said vehicle is within said first rear antenna beam pattern space; and warning a user that a risk of potential collision is present when said object located at the rear of said vehicle is determined to be in the space covered by said first rear antenna beam pattern.

15. A method according to claim 14 further comprising:

transmitting electromagnetic pulses using a specifically shaped second rear antenna beam pattern covering a second rear antenna beam pattern space, wherein said second rear antenna beam pattern space is defined as a rear portion of the space below a plane approximately coplanar with the roof of the vehicle;

receiving reflections of the transmitted electromagnetic pulses from said second rear antenna beam pattern space;

processing information gathered by the radar-based detector to determine if said object located at the rear of said vehicle is within said second rear antenna beam pattern space; and p1 not warning a user that a risk of potential collision is present when said object located at the rear of said vehicle is determined to be in said second rear antenna beam pattern space, irrespective of whether or not said object is also in said first rear antenna beam pattern space.

\* \* \* \* \*

UNITED STATES PATENT AND TRADEMARK OFFICE
CERTIFICATE OF CORRECTION

| | | |
|---|---|---|
| PATENT NO. | : 7,877,209 B2 | Page 1 of 1 |
| APPLICATION NO. | : 11/527926 | |
| DATED | : January 25, 2011 | |
| INVENTOR(S) | : Steven M. Harris et al. | |

It is certified that error appears in the above-identified patent and that said Letters Patent is hereby corrected as shown below:

Title Page, Item 54, the title includes a misspelled word. Please delete the current title:

"RADAR COLLISON WARNING SYSTEM FOR ROOFTOP MOUNTED CARGO"

and insert the corrected title:

--RADAR COLLISION WARNING SYSTEM FOR ROOFTOP MOUNTED CARGO--

Signed and Sealed this
Eighth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,877,209 B2 | Page 1 of 1 |
| APPLICATION NO. | : 11/527926 | |
| DATED | : January 25, 2011 | |
| INVENTOR(S) | : Steven M. Harris et al. | |

It is certified that error appears in the above-identified patent and that said Letters Patent is hereby corrected as shown below:

Title Page, Item (54) and at Column 1, lines 1 and 2, the title includes a misspelled word. Please delete the current title:

"RADAR COLLISON WARNING SYSTEM FOR ROOFTOP MOUNTED CARGO"

and insert the corrected title:

--RADAR COLLISION WARNING SYSTEM FOR ROOFTOP MOUNTED CARGO--

This certificate supersedes the Certificate of Correction issued May 8, 2012.

Signed and Sealed this
Twelfth Day of June, 2012

David J. Kappos
*Director of the United States Patent and Trademark Office*